E. BAKER.
CAPPING SHAVER AND MELTER FOR HONEYCOMBS.
APPLICATION FILED SEPT. 13, 1910.
994,813.
Patented June 13, 1911.
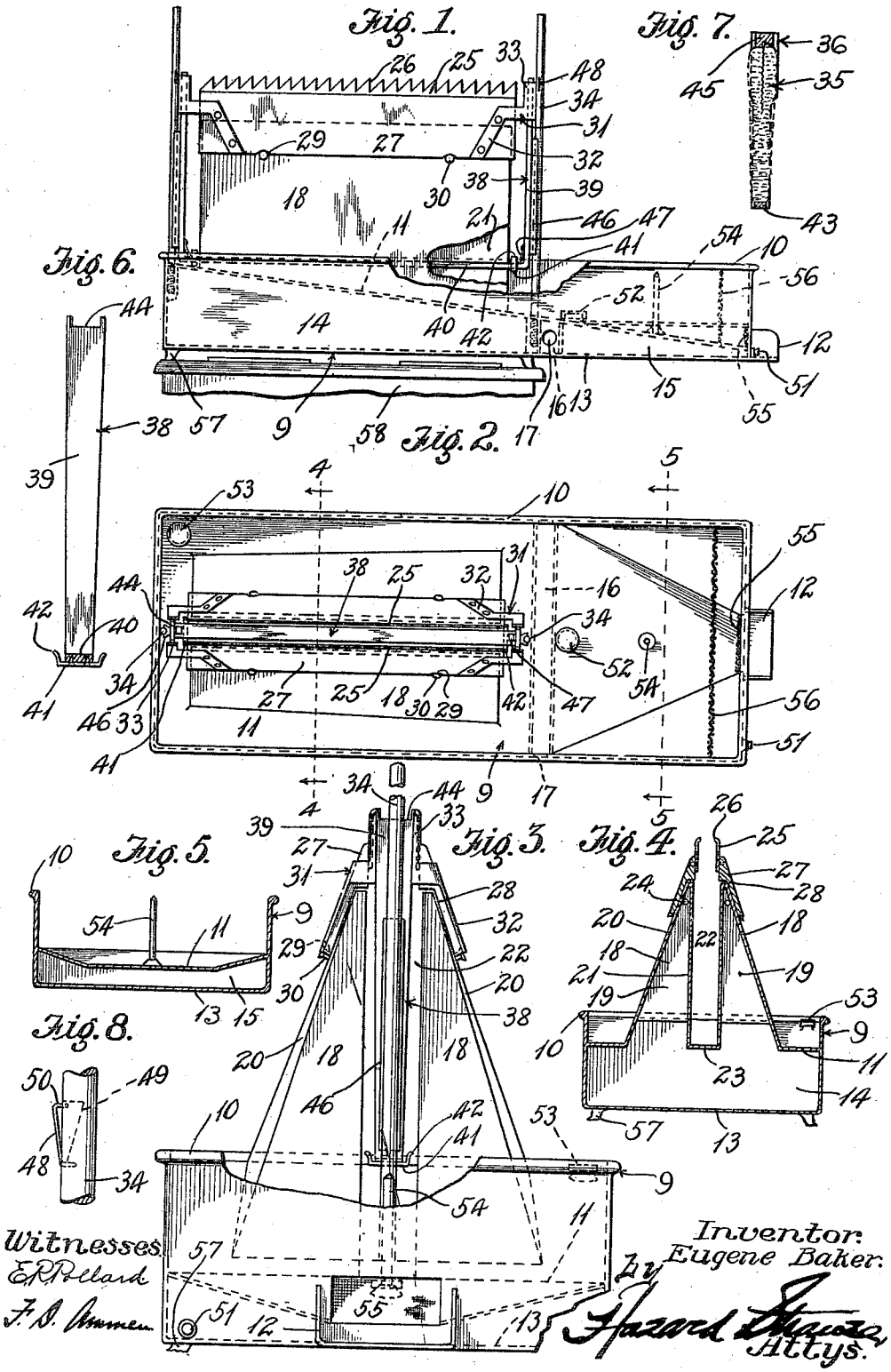
Witnesses
E. R. Pollard
F. D. Ammen
Inventor:
Eugene Baker.
by Hazard Stearns
Attys.

UNITED STATES PATENT OFFICE.

EUGENE BAKER, OF LOS ANGELES, CALIFORNIA, ASSIGNOR OF ONE-HALF TO CASSIUS H. CLAYTON, OF LOS ANGELES, CALIFORNIA.

CAPPING SHAVER AND MELTER FOR HONEYCOMBS.

994,813. Specification of Letters Patent. Patented June 13, 1911.

Application filed September 13, 1910. Serial No. 581,847.

*To all whom it may concern:*

Be it known that I, EUGENE BAKER, a citizen of the United States, residing at Los Angeles, in the county of Los Angeles and State of California, have invented new and useful Improvements in Capping Shavers and Melters for Honeycombs, of which the following is a specification.

In removing the honey from honey combs it is necessary to remove the capping of the comb so as to open the cells which contain the honey, and the combs are then placed in centrifugal machines to extract the honey.

The object of this invention is to produce a device of simple construction which is adapted for shaving or removing the capping of the comb prior to extracting the honey.

The device presents a pair of knives, which are heated, and it presents a guide for forcing the comb between these knives so that the knives operate to cut the caps off of the cells.

Special means is provided for adjusting the position of the knives to suit the width or thickness of the comb, and the device comprises a pan which saves the wax which is cut off and which also saves the honey which is removed in shaving the combs.

In the drawing forming a part of the annexed specification, Figure 1 is a side elevation of the device constructed according to my invention, certain parts being broken away. Fig. 2 is a plan of the device. Fig. 3 is an end elevation of the device upon an enlarged scale, certain parts being broken away. Fig. 4 is a cross section through the device, taken on the line 4—4 of Fig. 2. Fig. 5 is a cross section through the device, taken on the line 5—5 of Fig. 2. Fig. 6 is a vertical section taken through a holder which holds the frame carrying the honey comb. Fig. 7 is a vertical section through the honey comb and through the frame in which the honey comb is held. Fig. 8 is a side elevation showing a portion of a guide post and illustrating a spring clip for supporting the carriage in an elevated position.

Referring more particularly to the parts, 9 represents a pan having an edge or flange 10 extending continuously thereabout; said pan being of elongated rectangular form, as shown. This pan is provided with an inclined false bottom 11, which is elevated at the left end of the pan and depressed at the right end toward a delivery spout 12, which projects from the right end of the pan, as indicated in Fig. 2. Near this delivery spout the false bottom is slightly dished as indicated in Fig. 5. Between the false bottom 11 and the main bottom 13 of the pan, two water compartments are formed, a main compartment or hot water compartment 14 which is formed in the left portion of the pan, and a smaller or cold water compartment 15 which is formed at the right hand end of the pan, and between these compartments an insulating air space 16 is formed, at the ends of which space an opening 17 is formed in the side wall or flange of the pan so as to permit a free circulation of air through the air compartment.

At the left hand portion of the pan and directly over the hot water compartment 14 I provide upwardly extending horns 18, which form steam chambers 19 connecting with the interior of the hot water compartments, as shown in Fig. 4. These horns 18 present inclined outer faces or plates 20 and vertical inner faces 21, and these vertical faces or plates 21 are separated so as to form a gap or throat 22, said gap or throat 22 being closed below by a longitudinal strip 23 at the same level as the false bottom and which constitutes a part of the false bottom. At their upper ends these steam chambers are formed with vents 24 through which the steam may escape. These vents are disposed at the ends of the horns, as indicated.

The inner plates 21 of the horns are disposed vertically and parallel to each other, and it should be understood that the carriage containing the honey comb is forced down into the gap or throat 22 between these plates. On the upper ends or edges of the horns 18, knives 25 are mounted, said knives being in the form of blades having inwardly projecting teeth 26 and the lower edges of these blades are attached to shoes 27, which have pockets 28 on their under sides which receive the upper edges of the horns, as shown in Fig. 4. The shoes 27 are in the form of elongated plates as indicated in Fig. 1 and their lower edges are formed at intermediate points with notches or recesses 29, and these notches are adapted to engage pins or rests 30 projecting outwardly from the inclined face 20 of the horns, as shown. At their ends the shoes 27 are provided with adjusters 31, said adjusters having shanks 32 which are riveted to the plates as shown and having upwardly projecting prongs 33, as indicated in Fig. 3. In line with the throat or gap 22 and beyond the ends of the horns 19, I provide two guide posts 34 which project upwardly from the bottom of the pan and these posts are disposed on the central axis of the gap or throat 22 as indicated.

In Fig. 7 I show a honey comb 35 held in a frame 36. This honey comb usually tapers in width from the upper portion toward the lower portion as indicated. On this account it is necessary to guide the knives as the frame 36 is forced between the horns. For this purpose I provide a carriage or frame holder 38, illustrated in Fig. 6. This carriage is in the form of a three-sided frame having upwardly extending side bars 39 and a horizontal cross bar 40. The horizontal cross bar 40 is provided at two points with clips 41 having upwardly extending tongues 42 which are adapted to engage the edges of the lower bar 43 of the comb frame 36 so as to hold it in place, and the upper ends of the bars 39 are formed with sockets 44 which are adapted to receive the projecting ends of the upper bar 45 on the comb frame, as will be readily understood.

On their outer sides the bars 39 are provided with guide slippers 46, which engage the inner face of the guide posts 34 and guide the frame when it is being inserted. The bars 39 taper in width from their upper extremities toward their lower extremities, as indicated in Fig. 6. In the corners where the bars 39 connect with the cross bar 40 braces 47 are formed, as indicated in Fig. 1.

When the honey comb is to be shaved the comb and comb frame are placed in the carriage 38 with the bottom bar 43 resting on the bar 40 and the upper bar 45 with its ends in the sockets 44. The carriage 38 is then forced downwardly. In doing so the side edges of the prongs 39 engage with the inner face of the adjusters 31 and spread the knives 25 farther and farther apart as the comb descends. In this way the gap or space between the knives is adjusted automatically to suit the increasing thickness of the comb. From this arrangement the capping of the cells will be shaved off neatly and without the knives passing unnecessarily deep into the combs. The efficiency of the knives is greatly increased by the fact that they are highly heated from contact with the shoes 27, the shoes themselves being heated by contact with the steam chambers 19 into which steam rises from the water in the hot water compartment 13. In spreading the knives apart they simply tilt outwardly on their rests 30 and the weight of the shoes keeps them in contact with the edges of the prongs 39.

I provide means for holding the carriage in an elevated position. For this purpose at suitable points on the guide posts 34 I provide spring clips 48, which are adapted to be depressed into pockets 49 formed in the sides of the posts, as shown in Fig. 8. These spring clips 48 present shoulders 50 which are adapted to engage the lower ends of the guide slippers 46 so as to hold the carriage up, as will be readily understood.

The cold water compartment 15 is provided with a removable drain plug 51. This cold water tank may be filled by removing the screw cap 52 and a similar screw cap 53 is provided in connection with the hot water tank. At a suitable point on the upper side of the cold water tank 15 I provide an upwardly projecting pin 54 which has a point as shown.

After the honey comb has been shaved as described above, the comb frame 36 may be permitted to rest upon the point of this pin, so as to enable the comb to be turned around and examined to ascertain whether all the cells have been decapped. If not, this can be done at this time by means of an ordinary uncapping knife held in the hand.

At the right hand end of the pan at the entrance to the spout 12 I provide a fine gauze strainer 55 through which the honey and melted wax passes, and near this point I provide a transverse strainer 56 of coarser mesh which catches the slumgum and prevents its passing out of the pan with the honey and wax. On account of the high temperature of the horns 19, the honey and wax which fall upon them readily drain down the inclined side faces 20 and pass onto the false bottom 11, whence it gravitates toward the spout 12. I provide the cold water compartment 15 in order to cool the honey as it passes to the spout 12, for the reason that if it is exposd to a high temperature for any considerable time honey will turn dark.

The body portion of the pan which is disposed adjacent to the horns 19 is provided with feet 57 which are adapted to rest upon a burner 58 which enables the water in the compartment 14 to be heated. The air compartment 16 between the cold water tank and the hot water tank tends to keep the water in the cold water tank from acquiring the temperature of the hot water; but when it does rise to a high temperature it can be drained off and cold water substituted.

There is quite a variation in the form of honey combs; that is some of them taper more than others and some do not taper at all, and they are of different widths; for this reason the carriage 38 may be provided of different sizes and different tapers or made adjustable, to accommodate the different sizes and thicknesses of combs.

On account of the inward inclination of the teeth 26 of the knives, all of the teeth may be sharpened simultaneously by a sharpener applied on the inner sides.

What I claim is:

1. A device of the class described having a pair of knives adapted to engage the opposite sides of the honey comb, means for supporting said knives, means for guiding the honey comb so as to pass between said knives, and means for heating said knives.

2. In a device of the class described, in combination, a pan having upwardly extending horns forming chambers adapted to be heated by a heating medium, knives extending longitudinally of said horns and disposed apart so as to form a gap, said knives being supported on said horns so as to be heated thereby, and means for guiding the honey comb downwardly between said knives and into said gap.

3. In a device of the class described, in combination, a pan having upwardly extending horns forming chambers adapted to be heated by the heating medium, knives extending longitudinally of said horns and disposed apart so as to form a gap, said knives being supported on said horns so as to be heated thereby, means for guiding the honey comb downwardly between said knives and into said gap, and means for catching the cappings and honey removed by said knives.

4. In a device of the class described, in combination, a pan having upwardly extending horns forming chambers adapted to be heated by a heating medium, knives extending longitudinally of said horns and disposed apart so as to form a gap, said knives being supported on said horns so as to be heated thereby, means for guiding the honey comb downwardly between said knives and into said gap, and means for adjusting the space between said knives as the comb descends.

5. A device of the class described comprising means for simultaneously shaving opposite sides of the honey comb, means for holding the same, means for collecting the honey removed thereby, and means for cooling the honey.

6. In a device of the class described, a pair of oppositely disposed knives, means for supporting said knives, means for guiding a honey comb downwardly between said knives, means for collecting the cappings and honey removed by said knives, and means for cooling the honey at a point removed from said knives.

7. A device of the class described comprising a pan having a pair of upwardly projecting horns, said horns being disposed apart and forming a gap therebetween, means for heating said horns, a pair of knives supported on said horns and adapted to engage the opposite faces of a honey comb, and means for guiding a honey comb downwardly between said knives.

8. A device of the class described comprising a pan having a hot water compartment formed in the bottom thereof, and a cold water compartment formed in the bottom thereof, said pan having an inclined bottom elevated over said hot water compartment and depressed over said cold water compartment, and adapted to receive steam from said hot water compartment, said horns being disposed apart and forming a gap therebetween; a pair of knives supported on said horns, and adapted to be heated thereby, means for guiding a honey comb downwardly between said knives to shave the opposite sides thereof with said knives.

9. A device of the class described comprising a pan, a pair of oppositely arranged knives disposed over said pan, means for guiding a comb downwardly between said knives to shave the same, and a member projecting upwardly in said pan and adapted to support the comb frame pivotally over said pan.

10. In a device of the class described, in combination, a pan having a hot water compartment in the bottom thereof with upwardly projecting horns adapted to receive steam, a pair of knives supported on said horns and heated thereby, means for guiding a honey comb downwardly between said knives to shave the same, a cold water compartment in said pan beyond said hot water compartment, an insulating chamber formed between said compartments tending to prevent the passage of heat therebetween, said pan having an inclined bottom tending to conduct the honey from said horns over said cold water compartment.

11. A device of the class described comprising a pan having a guide mounted on said pan, a carriage adapted to move on said guides in a vertical plane and adapted to hold a honey comb frame, a pair of knives, means for supporting said knives disposed apart, and means for heating said knives.

12. In a device of the class described in combination, a pan, a pair of guides projecting upwardly therefrom, a pair of knives, means for movably supporting said knives between said guides, a carriage adapted to receive a honey comb frame, and mounted to slide in a vertical direction on said guides, means carried by said knives for engaging said carriage to adjust the position of said knives as said carriage descends, and means on said guides for holding said carriage in an elevated position.

13. A device of the class described having knives for shaving a honey comb, metal shoes carrying said knives and adapted to conduct heat thereto, and means for heating the same by steam.

In witness that I claim the foregoing I have hereunto subscribed my name this 6th day of September, 1910.

EUGENE BAKER.

Witnesses:
F. D. AMMEN,
EDMUND A. STRAUSE.

---

Copies of this patent may be obtained for five cents each, by addressing the "Commissioner of Patents, Washington, D. C."